United States Patent [19]

Kepplinger et al.

[11] Patent Number: 4,588,437
[45] Date of Patent: May 13, 1986

[54] METHOD FOR PRODUCING MOLTEN PIG IRON OR STEEL PRE-PRODUCTS IN A MELT-DOWN GASIFIER

[75] Inventors: Werner Kepplinger, Linz-Hart, Austria; Rolf Hauk, Achern, Fed. Rep. of Germany

[73] Assignees: Korf Engineering GmbH, Dusseldorf, Fed. Rep. of Germany; Voest-Alpine Aktiengesellschaft, Linz, Austria

[21] Appl. No.: 563,359

[22] Filed: Dec. 20, 1983

[30] Foreign Application Priority Data

Dec. 21, 1982 [AT] Austria .................. 4618/82

[51] Int. Cl.⁴ ............................................ C21B 11/08
[52] U.S. Cl. ............................................ 75/43
[58] Field of Search ..................... 75/26, 43, 38

[56] References Cited

U.S. PATENT DOCUMENTS

| | | | |
|---|---|---|---|
| 2,321,310 | 6/1943 | Moore | 75/26 |
| 2,978,315 | 4/1961 | Schenck et al. | 75/26 |
| 3,948,640 | 4/1976 | Elvander et al. | 75/26 |
| 4,317,677 | 3/1982 | Weber et al. | 75/26 |
| 4,396,421 | 8/1983 | Stift et al. | 75/11 |

FOREIGN PATENT DOCUMENTS 0010627 2/1981 European Pat. Off. .
1017314 3/1958 Fed. Rep. of Germany .
1086256 11/1961 Fed. Rep. of Germany .
DE3034520 3/1982 Fed. Rep. of Germany .

OTHER PUBLICATIONS

Ullmanns Encyklopadie der technischen Chemie, by Dr. E. Bartholome et al., Copyright 1973.

*Primary Examiner*—Melvyn J. Andrews
*Attorney, Agent, or Firm*—Brumbaugh, Graves, Donohue & Raymond

[57] ABSTRACT

There is disclosed a method and a melt-down gasifier for producing molten pig iron or steel pre-products and reduction gas. A first fluidized-bed zone is formed by coke particles, with a heavy motion of the particles, above a first blow-in plane by the addition of coal and by blowing in oxygen-containing gas. Iron sponge particles and/or pre-reduced iron ore particles with a substantial portion of particle sizes of more than 3 mm are added to the first fluidized-bed zone from above. A melt-down gasifier for carrying out the method is formed by a refractorily lined vessel having openings for the addition of coal and ferrous material, openings for the emergence of the reduction gases produced, and openings for tapping the metal melt and the slag. Pipes or nozzles enter into the meltdown gasifier above the slag level at at least two different heights.

15 Claims, 1 Drawing Figure

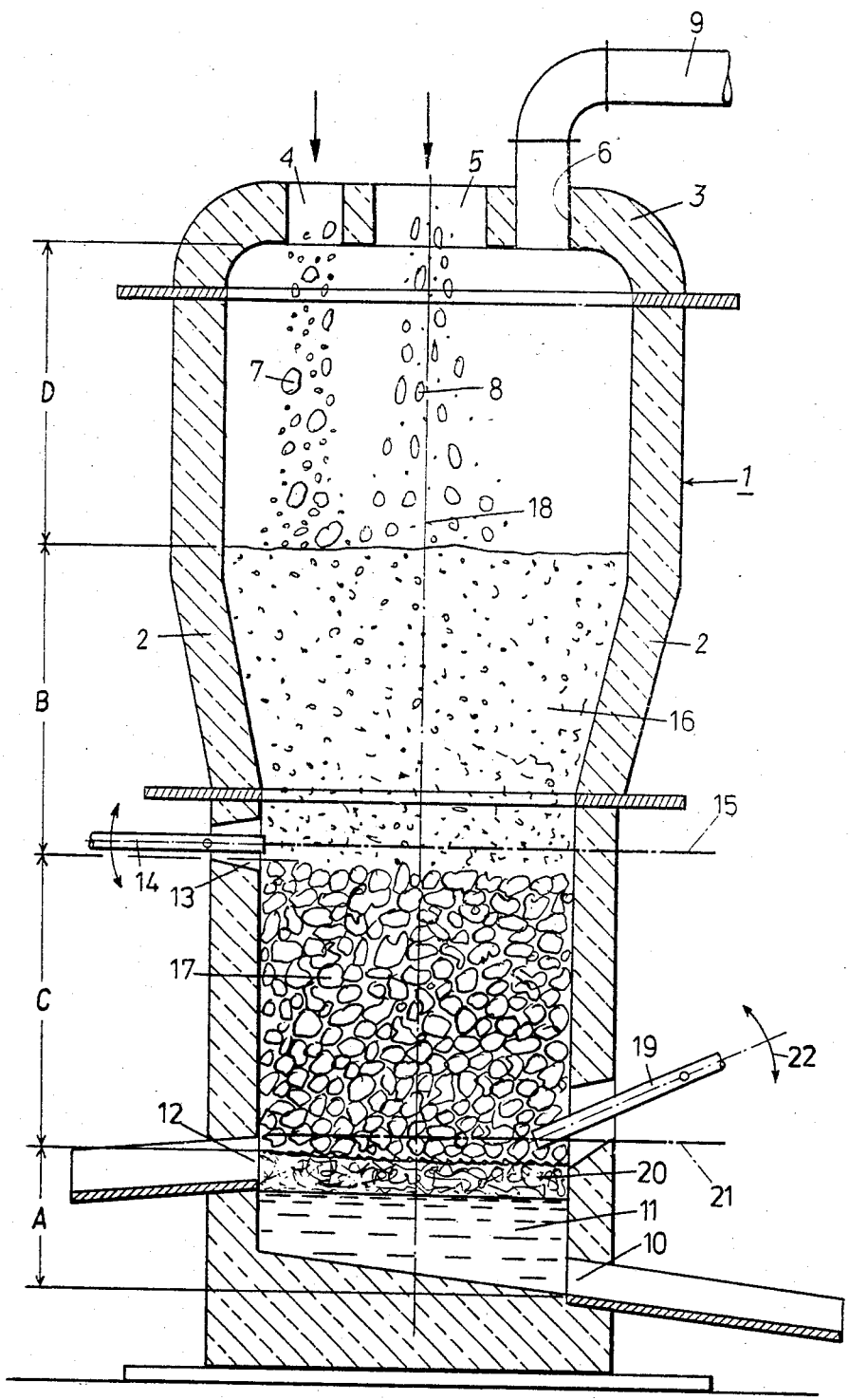

METHOD FOR PRODUCING MOLTEN PIG IRON OR STEEL PRE-PRODUCTS IN A MELT-DOWN GASIFIER

BACKGROUND OF THE INVENTION

The invention relates to improvements in a method and apparatus for producing molten pig iron or steel pre-products and reduction gas in a melt-down gasifier. In a known method, a first fluidized-bed zone is formed by coke particles, with a heavy motion of the particles, above the blow-in plane (first blow-in plane) by the addition of coal and by blowing in oxygen-containing gas. Iron sponge particles and/or pre-reduced iron ore particles are added to the first fluidized bed from above, with a substantial portion of the particle sizes being more than 3 mm are added to the first fluidized-bed zone from above the process is carried out in a melt-down gasifier, which is comprised of a refractorily lined vessel having openings for the addition of coal, ferrous material as well as for the emergence of the reduction gases produced. The lined vessel furthermore has openings for tapping the metal melt and the slag, and has pipes or nozzles which enter into the melt-down gasifier above the slag level at at least two different heights.

A method of this kind is known from European Patent B1-0010627. There, a coal fluidized-bed with a high-temperature zone in the lower region is produced in a melt-down gasifier, to which iron sponge particles are added from above. On account of the impact pressure and buoyancy forces in the coal fluidized-bed, iron sponge particles having sizes greater than 3 mm are considerably braked and substantially elevated in temperature by the heat exchange with the fluidized bed. They impinge on the slag layer forming immediately below the high-temperature zone at a reduced speed and are melted on or in the same. The maximum melting performance of the melt-down gasifier, and thus the amount and temperature of the molten pig iron produced, not only depends on the geometric dimensions of the melt-down gasifier, but also are determined to a large extent by the quality of the coal used and by the portion of larger particles in the iron sponge added. When using low-grade coal, the heat supply to the slag bath, and thus the melting performance for the iron sponge particles, decline accordingly. In particular, with a large portion of iron sponge particles having grain sizes of above 3 mm, which cannot be heated to the same extent as smaller particles by the coal fluidized-bed when braked in their fall and which, therefore, necessitate a higher melting performance in the region of the slag layer, the reduced melting performance has adverse effects in case low-grade coal is used.

By German Pat. No. 1017314 a method for producing burnable gases from dustlike to coarsely grained fuels is known, with which two fluidized-bed zones of coke particles are formed in a gas generator, wherein the upper zone, which is supplied with an endothermally reacting gasifying agent, is maintained in a heavily whirling motion and the lower zone, which is supplied with an exothermally reacting gasifying agent, is maintained in a a state ranging from unnoticeable to weak motion of the coke particles. In this manner, it is possible to reduce considerably the heat transported away through the whirling fuel at the site where the exothermic gasifying agents are supplied and to strip off the gasification residues, which sink down from the upper fuel layers as melted slag. In the "hot zone" of the gas generator, temperatures of 1,500° C. and more may be attained. According to this publication, it is also considered feasible to introduce ores together with the fuels into the gas generator and to tap the melted metal collecting on the bottom of the gas generator below the melted slag in a liquid state. In practice, the utilization of ores has not become notorious in connection with such a method for producing burnable gases. In this way, it is at best possible to reduce and melt fine ores in slight amounts.

By German Pat. No. 1086256 a method for recovering iron from dustlike or fine-grained iron ores has become known, with which a coke solid-bed is formed in a melting vessel by the addition of coke, in whose lower region a combustion medium, such as oxygen-enriched air, is injected immediately above the slag bath level. Above the coke solid-bed dust coal, pre-reduced ore and oxygen-enriched air are introduced into the melting chamber above the coke solid-bed, with molten iron and molten slag forming, falling down in droplets to the major portion and thus impinging on the coke solid-bed. In the latter, the slag is completely reduced, the iron is deoxidized and carburized, desulphurized and, if desired, enriched with predetermined alloying components. The burnable gases forming above the coke solid-bed flow upwardly and take the cold ore dust introduced into the melting chamber through upper entrance openings with them in order to pre-reduce the same in a separate pre-reduction chamber, from which it is then taken to be blown into the melting chamber. Also this method is suited only to recover iron from dustlike or fine-grained iron ores, but not when charging iron sponge particles having a substantial portion of particle sizes of above 3 mm.

SUMMARY OF THE INVENTION

The object of this invention is to increase the melting performance of a method of the initially defined kind. The tapping performance of molten pig iron or of steel pre-products is to be raised when charging a larger portion of ferrous material having particle sizes of above 3 mm and/or when charging coal of a lower quality. The present invention renders possible an increase in the temperature of the metal melt, so as to promote metallurgical reactions with the molten pig iron or steel pre-material obtained. Also, the realization of desired metallurgical reactions within the melt-down gasifier is facilitated. Finally, a reduction in height of the melt-down gasifier apparatus is made feasible.

The present invention, moreover, is directed to an arrangement for carrying out the method according to the invention.

The method according to the invention is characterized in that below the first blow-in plane and above the slag bath level, a second blow-in plane for oxygen-containing gas is provided and the gas supply thereto is regulated such that a second zone of a fluidized bed of coke particles with a weak or unnoticeable particle motion, or of a gas-passed solid-bed of coke particles, forms between the two blow-in planes. The temperature in the second zone is maintained at above the melting temperature of the ferrous material. With the method according to the invention, by departing from the method in the above described European Pat. No. 0010627, a further zone of coke particles with a weak or unnoticeable particle motion, or of a gas-passed solid-bed of coke particles, is formed below the first fluidized-bed zone of coke particles with a heavy particle motion. This is effected in that below a first blow-in plane for the first fluidized-bed zone, a further second blow-in plane is provided for the second zone, and the gas supply in the second blow-in plane is regulated such that the coke particles in the second zone move only slightly or have practically stopped. In either case, this second zone must, however, be capable of being flown through by gas in order to be able to carry away upwardly the burnable gases produced in the second blow-in plane. Suitably, the second zone is composed of relatively large coke particles. Advantageously, the second zone substantially is formed of coke particles having grain sizes of from 2 mm to 70 mm, in particular grain sizes of from 10 mm to 30 mm. For this purpose, lumpy coal is added into the melt-down gasifier from above, which is not completely gasified when passing through the first fluidized-bed zone, collecting in the second zone in the form of larger coke particles. To build up the second zone, coke or high-temperature brown-coal lump coke (BHT lump coke) may be used as carbon carriers alternately or additionally. With the method according to the invention, oxygen-containing gases such as air, technically pure oxygen or mixtures thereof, are supplied both in the first and in the second blow-in planes, taking care for a high heat supply in these planes because of an exothermic reaction. The second zone of stationary coke particles or coke particles in a weak motion, thus is between two high-temperature zones, i.e., the two blow-in planes for oxygen-containing gas, and can be heated to a high temperature, at any rate to a temperature above the melting temperature of the ferrous material, even with a poor quality of the coal, because the hot burnable gases of the second blow-in plane flow through the same. Preferably, the temperature in the second zone is maintained at 100° to 300° C. above the melting temperature of the molten metal and of the slag. Due to this relatively compact bed of coke particles in the second zone, the melting process, at least of the larger iron sponge particles, is shifted from the slag bath upwardly, because the larger iron sponge particles braked and heated in the first fluidized-bed zone now no longer are able to get immediately to the slag bath, but they remain lying on or in the uppermost layers of the second zone and are melted in the region of the first blow-in zone.

The melted material drops through the lower, second zone, reaching a temperature of about 1,400° to 1,500° C. In this temperature region, carbon monoxide forms almost exclusively during the reaction of carbon with oxygen via $CO_2$; pig iron that has formed cannot be re-oxidized in this reducing atmosphere. In the second zone, metallurgical reactions, such as carburation, silicon and manganese reductions, are additionally possible. This holds, in particular, for the desulphurization and for the reduction in the FeO-content of the slag. The quality of the metal products may be influenced by the introduction of carbon carriers and/or fluxes in the second zone.

Since, with the method according to the invention, the melt-down plane for larger iron sponge particles has been moved from the slag bath to the upper region of the second zone and only melted material having a correspondingly high temperature reaches the slag bath, it is possible, even when using low-grade coal, to attain sufficiently high temperatures in the slag bath and in the melt so that the pig iron or steel pre-material has sufficiently high temperatures even after tapping, in order to subsequently carry out the desired metallurgical reactions. It is a necessary prerequisite that the larger iron sponge particles, which remain lying on top of the second zone, actually be melted there, i.e., that oxygen-containing gas be supplied to the first blow-in plane between the first fluidized-bed zone and the second zone so as to bring about an exothermic reaction in this region. If, as is the case with the method according to German Pat. No. 1017314, an endothermally reacting gasifying agent were supplied to the first blow-in zone, the iron sponge particles could not be melted there and larger particles would accumulate in the second zone, thus forcing the interruption of the process.

The state of the gas-passed bed of granular solids basically depends on the grain size and on the density of the solids as well as on the velocity of the flowing gas. The pressure loss of the gas in dependence on the height of the bed increases with a growing gas velocity until the "loosening point" of the solid bed has been reached, at which the bed changes into a flowing state (cf. Ullmanns Encyklopä die der technischen Chemie, Vol. 3, Verlag Chemie, 4th Edition, 1973, pp. 434 to 439).

If the second zone is built up by a lumpy coke layer, gases may pass this zone at relatively high velocities without loosening of this layer occurring.

If the second zone is formed by coke particles having approximately the same grain-size distribution as in the first fluidized-bed zone, i.e., by particles having diameters of from 0.5 to 10 mm, preferably from 1 to 3 mm, the gases must be injected into the second zone at accordingly lower velocities than the velocities of the injected gases in the first fluidized-bed zone.

Advantageously, the height of the second zone is 1.0 to 3.0 m, preferably about 2 m.

The introduction of energy into the second zone is effected by the burning of the coke particles with the oxygen supplied. For a further temperature adjustment and in order to reduce the burn-off velocity of the coke in the second zone, part of the reduction gases formed, liquid hydrocarbons and/or fine-particle coal suitably are additionally introduced into that zone as carbon carriers.

The oxygen-containing gas and, if desired, the carbon carriers and/or fluxes may be introduced into the second zone at any desired site. Preferably, they are, introduced laterally in the lower region of this zone.

According to a further advantageous embodiment oxygen-containing gas and/or carbon carriers and/or fluxes are introduced into the second zone of coke particles at various levels.

Suitably, the oxygen-containing gas and/or carbon carriers are introduced into the second zone of coke particles in a preheated state.

To adjust the temperature of the second zone, $CO_2$-containing gas, e.g., blast-furnace gas from a reduction shaft incorporated in the method, may be returned to the hot second zone. Therein, $CO_2$ is reacted to CO in an endothermic reduction. Thereby, valuable reduction gas forms, in turn, which is additionally made available to the process. It is also imaginable to use hydrocarbons in liquid or gaseous states instead of blast-furnace gas.

In order to obtain a uniform gas passage and as intensive a heating of the second zone as possible, the gases in the second blow-in plane are blown in at a velocity that lies below the loosening velocity of the solid bed.

The distance of the nozzle planes from the bottom of the melt-down gasifier in m is calculatable according to the following formulas.

$$h_1 = C_1 + \frac{P_V \cdot T_A}{C \cdot D_V^2} \quad (1)$$

$h_1$ = height of lower (second) blow-in plane (m)
$C_1$ = constant: 0.20 to 0.30 m (safety value in order to prevent liquid slag from obstructing the nozzles)
$C$ = constant: 2.98 (t/m$^3$) (on the assumption of a melt density of 7.6 (t/m$^3$)
$P_V$ = melt-down performance (t/h)
$T_A$ = tapping interval (h)
$D_V$ = diameter of melt-down gasifier (m)

$$h_2 = h_1 + 0.5 C_2 \quad (2)$$

$h_2$ = height of upper (first) blow-in plane (m)
$C_2$ = material constant of fuel (m)

The height of the lower blow-in plane above the bottom of the melt-down gasifier results from the tapping performance and the cross section of the foot of the melt-down gasifier. For instance, the height of the lower blow-in plane at a melt-down performance of 40 t/h, a tapping interval of 'h and an inner diameter in the foot of the melt-down gasifier of 3 m amounts to between 3.18 to 3.28 m.

The value for $C_2$ varies from 1 m to 5 m, depending on the quality of the fuel used. If a small size fuel with a high calorific value and a good reactivity is used, the value for $C_2$ is close to 1 m, which corresponds to a distance between the blow-in planes of about 0.5 m. If lumpy material with a low calorific value and/or a low reactivity is gasified, the value of $C_2$ rises up to 5 m, and thus the distance between the two blow-in planes is about 2.5 m.

According to an advantageous development of the invention, the gases, in the second blow-in plane, are blown in at a periodically varying velocity (in a pulsed mode). By this means, whirling up in this zone can safely be avoided and possible pressure maxima occurring in the coke solid bed may be reduced, i.e., local excessive amounts of oxygen-containing gas or reduction gas are more readily distributed in the solid bed.

Preferably, the gases in the second blow-in plane are blown-in in a pulsed mode with a period lasting for 10 seconds to 2 minutes, the peak values of the periodically varying gas velocity optionally lying above the clear-tube velocity corresponding to the loosening velocity for the solid bed for a short time.

If several nozzles are provided to introduce the gases into the second zone, they may alternately be fed with more or less gas, the period likewisely suitably being adjusted to between 10 s and 2 min—depending, in particular, on the diameter and on the height of the second zone. Since the pressure loss of the gas in a coke bed passes a maximum when exceeding the loosening velocity, larger gas amounts may be introduced into the second zone by the pulsed injection of the gases described (cf. Ullmanns Encyklopädie der technischen Chemie, Vol. 3, Verlag Chemie, 4th Edition, 1973, p. 439). The height of the pre-pressure to be adjusted at the outlet of the gas supply means substantially results by adding up the pressure loss in the first coke fluidized-bed zone and the pressure loss in the second zone.

As an arrangement for carrying out the method according to the invention, a melt-down gasifier of the initially defined kind is suited, as is basically described in European Pat. No. 0010627, provided that at least two blow-in planes be provided. The pipes or nozzles must, of course, be adapted to the media to be blown in. The mouths of the nozzles are to be located 20 to 30 cm above the highest expected slag bath level in order to prevent the same from being obstructed by slag. In view of the changing height of the slag level, the mouths of at least the lower pipes or nozzles in the melt-down gasifier, according to the invention, are adjustable in height, wherein this may be achieved by an axial displacement with obliquely downwardly directed nozzles or by arranging the pivot axis at a distance from the nozzle mouths with vertically pivotable nozzles. As pivotable pipes or nozzles, those described in German Pat. No. 3034520 are suited.

Suitably, at least the lower pipes or nozzles are cooled in the mouth region.

DESCRIPTION OF EXEMPLARY EMBODIMENT

The invention will now be explained in more detail by way of the accompaying drawing, the single FIGURE of which illustrates, schematically in section, a melt-down gasifier 1 whose side walls 2 are refractorily lined on their inner sides.

The hood 3 of the melt-down gasifier 1 is penetrated by three openings 4, 5 and 6. The opening 4 is destined for charging coal or coke 7 of various grain or piece sizes. Through the opening 5, particulate ferrous material 8, preferably iron sponge, with a substantial portion of particle sizes of above 3 mm, is added. It is suitable to supply the iron sponge at a temperature of about 700° C. To carry away the reduction gas forming, a conduit 9 is provided, which is inserted in the opening 6. The reduction gas carried away primarily is used to pre-reduce or reduce oxidic iron ore.

The melt-down gasifier comprises a lower section A, a central section B, an intermediate section C between sections A and B and an upper section D above the central section B, whose cross section is widened and which serves as a killing space.

In the bottom region of the lower section A of the melt-down gasifier 1, which serves to collect molten metal and liquid slag, a tapping opening 10 for the melt 11 is provided in the wall 2. A little bit higher, there is an opening 12 for the slag tap in the lower section A.

In the lower region of the central section B of the melt-down gasifier 1, a nozzle pipe 14 is guided through an opening 13 in the wall 2, through which oxygen-containing carrier gas and, if desired, carbon carriers are introduced into the melt-down gasifier 1 in a first horizontal blow-in plane 15.

Preferably, a plurality of openings 13 with nozzle pipes 14 are present in this plane of the melt-down gasifier. In the central section B, a first fluidized-bed zone 16 is formed by coke particles, with a heavy motion of the particles.

The intermediate section C, which, in the embodiment illustrated, is cylindrically designed, is provided to accommodate a second zone 17 of a fluidized bed formed by coke particles, with a weak or unnoticeable motion of the particles, or of a solid bed of coke particles.

Through the wall of the intermediate section C, supply means, in the present case nozzle pipes 19, are guided, which are directed to the central axis 18 of the melt-down gasifier and are provided for oxygen-containing gas and carbon carriers, projecting into the second zone 17 of coke particles, with their mouths being arranged closely above the slag layer 20. In the drawing, just one nozzle pipe 19 has been illustrated. Depending on the size of the melt-down gasifier, 10 to 40, preferably 20 to 30, nozzle pipes 19 may be provided, whose mouths are located substantially in a second horizontal blow-in plane 21. The nozzle pipes 19 are arranged so as to be vertically pivotable in the direction of the double arrow 22. Also the nozzle pipes 14, through which the carrier gas and additional fuel flow into the first fluidized-bed zone 16, are designed to be vertically pivotable with the embodiment of the invention illustrated.

The ferrous material 8 introduced through the opening 5 at first reaches the first fluidized-bed zone 16 after having fallen through the upper section D of the melt-down gasifier serving as a killing space, in which zone 16 it is braked and heated. Smaller particles melt, drop through the second zone 17 of coke particles and get into the lower section A. Larger particles at first remain lying on the second zone 17 or are held fast in the uppermost layer of this zone, until they are also melted upon the action of the high temperature prevailing in the region of the first blow-in plane 15. In the second zone, the downwardly dropping metal melt is overheated and, if desired, may be treated by the reaction of fine-particle fluxes, which are introduced through the nozzle pipes 19. The metal melt 11 tapped through the opening 10 is sufficiently hot in order to be subjected to further metallurgical aftertreatments. Above the melt 11, a layer of liquid slag 20 collects, which is stripped off via the tap opening 12.

The carbon particles, during operation of the melt-down gasifier, must be continuously supplemented through the opening 4 with larger pieces, which are preferably used to build up the second zone 17, falling through the first zone 16.

What we claim is:

1. A method of producing molten pig iron or steel preproducts and reduction gas in a melt-down gasifier in which molten pig iron or steel preproducts and a superposed slag bath are collected at the bottom of said gasifier, which method comprises the steps of
    forming a first zone comprised of a fluidized-bed of coke particles by adding coal and blowing in oxygen-containing gas in a first blow-in plane, said blown-in gas inducing relatively heavy motion of the coke particles above said first blow-in plane,
    adding from above to said first fluidized bed zone ferrous material comprised of at least one of iron sponge particles, and pre-reduced iron ore particles, with a substantial portion of particle sizes of more than 3 mm,
    blowing in oxygen-containing gas in a second blow-in plane below said first blow-in plane and above the level of said slag bath,
    regulating the gas supply blown in at said second blow-in plane to form a second zone between said first blow-in plane and said second blow-in plane, said second zone being comprised of a fluidized bed of coke particles whose motion is weak or unnoticeable relative to the motion of the coke particles in said first zone,
    maintaining the temperature in said second zone above the melting temperature of said ferrous material, and
    drawing off the collected molten pig iron or steel preproducts.

2. A method as set forth in claim 1, wherein said second zone is comprised of a solid bed of coke particles through which gas may pass.

3. A method as set forth in claim 1, wherein said second zone is substantially formed by coke particles having particle sizes of from 2 mm to 70 mm.

4. A method as set forth in claim 1, wherein said second zone is substantially formed by coke particles having particle sizes of from 10 mm to 30 mm.

5. A method as set forth in claim 1, wherein the height of said second zone is 1 m to 3 m.

6. A method as set forth in claim 1, wherein the height of said second zone is about 2 m.

7. A method as set forth in claim 2, herein the gas supply in said second blow-in plane is regulated to have a clear-tube velocity below the loosening velocity for a solid bed.

8. A method as set forth in claim 1, wherein the gases in said second blow-in plane are blown in in a pulsed mode at a periodically varying velocity.

9. A method as set forth in claim 8, wherein the gases in said second blow-in plane are blown in in a pulsed mode with a period lasting for 10 seconds to 2 minutes.

10. A method as set forth in claim 2, herein the gases in said second blow-in plane are blown-in in a pulsed mode at a periodically varying velocity, the peak values thereof, for short periods, being above the clear-tube velocity and corresponding to the loosening velocity for said solid bed.

11. A method as set forth in claim 1, further comprising the step of blowing in carbon carriers into said second zone of coke particles, said carbon carriers being selected from the group consisting of gaseous, liquid and fine-particle solid carbon carriers.

12. A method as set forth in claim 1, further comprising the step of introducing fluxes into said second zone of coke particles.

13. A method as set forth in claim 11 or 12, wherein at least one of said oxygen-containing gas, said carbon carriers and said fluxes are introduced laterally into the lower region of said second zone of coke particles.

14. A method as set forth in claim 11 or 12, wherein at least one of said oxygen-containing gas, said carbon carriers and said fluxes are introduced into said second zone of coke particles at various levels.

15. A method as set forth in claim 11, wherein at least one of said oxygen-containing gas and said carbon carriers are introduced into said second zone of coke particles in a preheated state.

* * * * *